Patented Aug. 12, 1930

1,772,936

UNITED STATES PATENT OFFICE

TURE ROBERT HAGLUND, OF STOCKHOLM, SWEDEN, ASSIGNOR TO INTERNATIONAL PATENT CORPORATION, A CORPORATION OF MARYLAND

PROCESS FOR PRODUCING ALUMINUM COMPOUNDS

No Drawing. Application filed April 6, 1925, Serial No. 21,205, and in Sweden April 17, 1924.

The present invention refers principally to processes for producing highly refractory oxides and belongs in this respect to processes of the kind referred to in Patent No. 1,569,483, in which the ores or other products containing highly refractory oxide are first smelted, for instance in an electric furnace, together with reducing agents and sulphurous materials for producing a slag, containing a sulphide, as well as one or more highly refractory oxides, and the sulphide subsequently separated out of the slag to obtain the highly refractory oxides. By highly refractory oxides are here meant oxides with a melting point at or above 1800° C. The process thus referes among others to the production of pure oxides of aluminum, magnesium, chromium and ziroconium, as well as to refined materials containing one or more of such oxides.

According to the present invention the sulphides are separated wholly or partly by treating the obtained slag containing sulphide and oxide with chlorine gas or hydrochloric acid gas for transforming the sulphide into chloride, and subsequently this chloride is separated from the rest of the slag. The separation of the chloride, in case the same is very volatile, can be effected by keeping the temperature so high during or after the treatment with chlorine or hydrochloric acid gas, that the chloride is gasified, whereupon it is suitably condensed in a receiver or the like. The temperature may then be regulated in such a way that chlorides with different boiling or vaporizing temperatures can be separated from each other. The rest of chlorides in the slag can then be lixiviated by water and, if required, refined still further, for example by magnetic separation, treatment with diluted or concentrated acids or alkalies or other means. Alternatively the whole of the percentage of chlorides can be removed by lixiviation.

This process is of great importance in the production of aluminum oxide, particularly aluminum oxide of sufficient purity to be used for the production of common commercial aluminum, but it also may be used in the production of aluminum oxide for other purposes i. e. for the manufacture of refractory materials, grinding wheels etc.

The production of pure aluminum oxide according to the present process is carried out by melting one or more raw materials containing aluminum oxide, such as bauxite, alundum, clays and others, with one or more sulphurous materials and reducing agents in such proportions and under such thermal conditions that a slag is formed containing both sulphides and aluminum oxide, the oxide of the largest percentage in the slag being aluminum oxide. This compound is thereupon, preferably after crushing, treated with chlorine gas or hydrochloric acid gas.

The sulphurous materials most suitable for the process are sulphides or sulphidiferous materials, such as FeS, $Cu_2S$, NiS, ZnS, PbS, $Al_2S_3$, CaS, BaS, MgS, magnetic pyrites, iron pyrites, copper pyrites, zincblende, galenite, sulphidiferous smelting products of different kinds for instance copper matte, but other sulphates, such as $BaSO_4$, can be used with advantage. As a reducing agent in the process carbon or carboniferous substances, such as anthracite, anthracite dust, coke, coke dust, char-coal, char-coal dust, can be used.

The smelting may be suitably carried out in an electrical furnace of the common carbide furnace type. If desired the ingredients of the charge may be wholly or partly supplied in the form of briquettes.

If sulphides of heavy metals are used during the smelting, they will react, on account of the presence of carbon or other reducing agent, with aluminum oxide and the oxides of barium, calcium or magnesium, to form free metals and corresponding sulphides of one or more of the metals aluminum, barium, calcium, and magnesium, which sulphides in their melted condition dissolve the rest of the aluminum oxide, forming a compound of sulphide and aluminum-oxide. The metal separated during this reaction will form components of an alloy, if the metal does not gasify, as for instance zinc will do on account of its volatility. If the raw materials contain $SiO_2$, $Fe_2O_3$, $TiO_2$ or similar oxides, as bauxite does, the alloy will also contain the metals separated out through the reduction of these oxides.

The treatment of the slag-containing sulphide and aluminum oxide with chlorine gas or hydrochloric acid gas according to the present process is very favourable if the whole or a considerable part of the sulphide in the slag consists of aluminum sulphide. By treating the slag with waterfree or practically waterfree chlorine gas or hydrochloric acid gas, waterfree aluminum chloride is obtained as a particularly valuable by-product. The treatment is conveniently carried out by leading the said gas through or over the crushed mass of sulphide and aluminum oxide. If preferred the treatment may be carried out at such a low temperature, for instance, room temperature, that no or very little chloride is gasified during its formation. At the end of or after the treatment with gas, however, it is suitable to raise the temperature, so that at least such volatile chlorides as for instance $AlCl_3$ will be gasified, the vapors being condensed in a receiver or other condensing device.

At higher temperatures the formation of the chloride or chlorides takes place more rapidly. Therefore, in many cases it is more convenient, when leading the gases above the mass, to regulate the temperature in such a way that the formed volatile chloride, such as aluminum chloride, immediately gasifies. This gasified chloride may then be accumulated in a suitable condensing device. When treating the mass with hydrochloric acid gas sulphuretted hydrogen is formed. Out of this gas sulphur may be produced or the same may be burned and used for the manufacture of sulphuric acid, which eventually can be used for the production of hydrochloric acid gas. The latter gas may also be produced by direct reaction between sulphuretted hydrogen and chlorine gas.

If in the mass of oxide after the treatment with the gas or gases, there remain certain chlorides, such as $CaCl_2$, $BaCl_2$, $FeCl_2$, these may be lixiviated with water or other means. If required, the mass may be further refined by known methods.

It has been pointed out above that the invention principally relates to processes for producing highly refractory oxides, wherein waterfree aluminum chloride according to certain modifications of the invention can be generated as a valuable by-product when producing aluminum oxide out of a slag containing aluminum oxide and aluminum sulphide, and if desired, a large percentage of waterfree aluminum chloride can be produced by this process. In such a case the proportion between aluminum oxide ores, reducing agents, and sulphurous material, is so regulated that the slag formed contains no or very little aluminum oxide, but wholly or mainly consists of aluminum sulphide. This product is then treated in the same way as stated above with chlorine or hydrochloric acid gas for the generation of waterfree aluminum chloride. Instead of or together with the said gas or gases one or several other waterfree or practically waterfree chlorine combinations can be used for transforming the aluminum sulphide into chloride, such as $NH_4Cl$, $NaCl$, $KCl$, $BaCl_2$, $MgCl_2$, $FeCl_3$, $PCl_3$ and others. Such a chloride may then be mixed with the sulphidiferous product and heated to a high enough temperature to distill over the aluminum chloride. If the used chloride is comparatively volatile, as is the case with $NH_4Cl$, $PCl_3$ and $FeCl_3$, the same may be led over the material containing aluminum sulphide.

As a rule, the obtained aluminum chloride contains impurities, such as sulphuretted hydrogen, and chlorine-sulphur combinations. Certain impurities, such as sulphuretted hydrogen, can be removed by leading chlorine or hydrochloric acid gas or some other suitable gas over the same. For this purpose it is preferable to heat the aluminum chloride somewhat or to redistill it in an atmosphere of one of the said gases. It is also convenient to mix the aluminum chloride with one or more materials that are able to combine with sulphur or chlorine respectively and to redistill or resublimate the same. As examples of such materials may be mentioned calcium carbide and aluminum sulphide. It also is possible to achieve the same purpose by gasifying the aluminum chloride and leading it through or over such substances.

The treatment of the aluminum sulphide, and the slag containing sulphide and oxide with chlorine or chlorine combinations can be carried out continuously or discontinuously in furnaces or apparatus of different kinds, such as retorts, shaft furnaces, or rotary furnaces. The necessary heating can be effected by known methods, such as direct or indirect heating by hot gases, electrical heating etc.

Aluminum chloride produced by the present method can also be used with advantage for oil refining purposes. It can also be used for producing aluminum oxide and other aluminum compounds. If ammonium chloride is used for transforming aluminum sulphide into aluminum chloride, the distillation products can be led directly into water if desired. The formed aluminum chloride will then react with the simultaneously distilled ammonia or ammonium sulphide, to form hydrate of aluminum under recovery of ammonium chloride.

I claim:

1. The process for producing aluminum compounds, which comprises forming a slag containing aluminum sulphide by fusing ores or products containing aluminum oxide together with metallic sulphide and reducing agent cooling the slag; and converting aluminum sulphide in said slag into anhydrous aluminum chloride by treating the slag with a chlorinating agent at a temperature considerably lower than the temperature necessary for the formation of said aluminum sulphide.

2. The process for producing aluminum compounds, which comprises forming a slag containing aluminum sulphide by fusing ores or products containing aluminum oxide together with a sulphide and reducing agent; cooling the slag; and treating the slag with a chlorinating agent at a lower temperature than necessary for the formation of said aluminum sulphide.

3. The process for producing aluminum compounds, which comprises forming a slag containing aluminum sulphide by fusing bauxite together with a reducing agent and material containing an iron-sulphur compound; solidifying said slag, and treating said slag with hydrochloric acid gas at such a temperature that anhydrous aluminum chloride is volatilized and the substantial part of formed ferrous chloride remains in the slag.

4. The process for producing aluminum oxide, which comprises forming a slag containing both sulphide and aluminum oxide by fusing ores or products containing aluminum oxide together with reducing agent and a sulphide; solidifying said slag; and treating said slag with a chlorinating agent at a temperature lower than that necessary for the formation of the slag; and removing the formed chloride compound from the aluminum oxide.

5. The process for producing aluminum oxide, which comprises forming a slag containing both sulphide and aluminum oxide by fusing ores or products containing aluminum oxide together with reducing agent and a metal sulphide; cooling, crushing and thereafter treating said slag with a gaseous chlorinating agent; and separating the formed chloride compounds from the aluminum oxide.

6. The process for producing aluminum oxide, which comprises forming a slag containing both aluminum sulphide and aluminum oxide by fusing bauxite together with reducing agent and a metal sulphide; cooling and thereafter treating said slag with hydrochloric acid gas; and separating the formed chloride compounds from the aluminum oxide.

7. The process for producing aluminum oxide, which comprises forming a slag containing both aluminum sulphide and aluminum oxide by fusing bauxite together with reducing agent and an iron-sulphur compound; cooling, crushing and thereafter treating said slag with hydrochloric acid gas at such a temperature that formed anhydrous aluminum chloride is volatilized.

8. The process for producing aluminum oxide, which comprises forming a slag containing aluminum sulphide and aluminum oxide and impurities of ferrous sulphide by fusing ores or products containing aluminum oxide together with reducing agent and an iron-sulphur compound; cooling and thereafter treating said slag with hydrochloric acid gas at such a temperature that anhydrous aluminum chloride is volatilized and that the substantial part of formed ferrous chloride remains in the slag.

TURE ROBERT HAGLUND.